United States Patent
Gellerich et al.

(10) Patent No.: US 10,684,857 B2
(45) Date of Patent: Jun. 16, 2020

(54) DATA PREFETCHING THAT STORES MEMORY ADDRESSES IN A FIRST TABLE AND RESPONSIVE TO THE OCCURRENCE OF LOADS CORRESPONDING TO THE MEMORY ADDRESSES STORES THE MEMORY ADDRESSES IN A SECOND TABLE

(71) Applicant: INTERNATIONAL BUSINESS MACHINES CORPORATION, Armonk, NY (US)

(72) Inventors: Wolfgang Gellerich, Boeblingen (DE); Gerrit Koch, Ammerbuch (DE); Peter M. Held, Renningen (DE); Martin Schwidefsky, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/885,939

(22) Filed: Feb. 1, 2018

(65) Prior Publication Data
US 2019/0235872 A1 Aug. 1, 2019

(51) Int. Cl.
*G06F 9/38* (2018.01)
*G06F 9/30* (2018.01)
*G06F 12/0875* (2016.01)

(52) U.S. Cl.
CPC ........ *G06F 9/3802* (2013.01); *G06F 9/30138* (2013.01); *G06F 12/0875* (2013.01); *G06F 2212/452* (2013.01)

(58) Field of Classification Search
CPC .............. G06F 9/3802; G06F 9/30138; G06F 12/0875; G06F 2212/452; G06F 9/30047;
(Continued)

(56) References Cited

U.S. PATENT DOCUMENTS

| 6,415,377 B1 | 7/2002 | Van Der Wolf et al. |
| 7,549,022 B2 | 6/2009 | Baker |

(Continued)

FOREIGN PATENT DOCUMENTS

| JP | 10232775 A | 9/1998 |
| WO | 2016056217 A1 | 4/2016 |

OTHER PUBLICATIONS

Ebrahimi et al., "Techniques for Bandwidth-Efficient Prefetching of Linked Data Structures in Hybrid Prefetching Systems", 2008 IEEE, pp. 7-17.
(Continued)

*Primary Examiner* — Aimee Li
*Assistant Examiner* — Shawn Doman
(74) *Attorney, Agent, or Firm* — Tihon Poltavets

(57) ABSTRACT

A method includes storing a first address of a first instruction executed by a processor core in a first table, where the first instruction writes a value into a register for utilization in addressing memory. The method stores the first address of the first instruction executed by the processor core in a second table with multiple entries, where a register value loaded into the register is utilized as a second address by a second instruction executed by the processor core to access a main memory. The method determines whether an instruction address associated with an instruction executed by the processor core is present in the second table, where the instruction address is the second address. Responsive to determining the instruction address is present in the second table, the method prefetches data from the main memory, where the register value is utilized as the second address in the main memory.

15 Claims, 5 Drawing Sheets

(58) Field of Classification Search
CPC ...... G06F 8/4442; G06F 12/0862; G06F 9/35; G06F 9/355; G06F 9/383
USPC ....................................................... 712/207
See application file for complete search history.

(56) References Cited

U.S. PATENT DOCUMENTS

| | | |
|---|---|---|
| 8,020,169 B2 | 9/2011 | Yamasaki |
| 8,141,098 B2 | 3/2012 | Bradford et al. |
| 8,161,245 B2 | 4/2012 | Fields, Jr. et al. |
| 8,161,264 B2 | 4/2012 | Arimilli et al. |
| RE45,086 E | 8/2014 | Coldewey |
| 9,069,675 B2 | 6/2015 | Greiner et al. |
| 9,110,810 B2 | 8/2015 | Wang et al. |
| 9,280,474 B2 | 3/2016 | Pavlou et al. |
| 9,411,587 B2 | 8/2016 | Heisch |
| 2009/0077011 A1 | 3/2009 | Natarajan et al. |
| 2009/0089548 A1* | 4/2009 | Sung ................... G06F 9/30047 712/207 |
| 2009/0171954 A1 | 7/2009 | Liu et al. |
| 2010/0070716 A1* | 3/2010 | Toyoshima ......... G06F 9/30047 711/137 |
| 2012/0137075 A1 | 5/2012 | Vorbach |
| 2012/0151149 A1 | 6/2012 | Dubrovin et al. |
| 2012/0324142 A1 | 12/2012 | Boyle et al. |
| 2015/0378780 A1* | 12/2015 | Busaba ................ G06F 9/3842 711/137 |
| 2016/0019152 A1 | 1/2016 | Gooding |
| 2016/0055095 A1 | 2/2016 | Faraboschi et al. |

OTHER PUBLICATIONS

Mittal, "A Survey of Recent Prefetching Techniques for Processor Caches", ACM Computing Surveys, vol. 0, No. 0, Article 0, Publication date: 2016, pp. 1-36.

Malhotra et al., "Library-based Prefetching for Pointer-intensive Applications", Computer Systems Laboratory Stanford University, Feb. 2006, pp. 1-16.

Arzen, "The Autonomous Cloud", http://www.control.lth.se/Staff/KarlErikArzen.html, Lund University, printed Jan. 18, 2018, 5 pages.

* cited by examiner

DATA PREFETCHING THAT STORES MEMORY ADDRESSES IN A FIRST TABLE AND RESPONSIVE TO THE OCCURRENCE OF LOADS CORRESPONDING TO THE MEMORY ADDRESSES STORES THE MEMORY ADDRESSES IN A SECOND TABLE

The present invention relates in general to data processing systems, in particular, to a processor cache of a processor core connected to a main memory with a data prefetcher for prefetching data into a processor cache of a processor core connected to a main memory.

BACKGROUND

Presently, data prefetchers exist in hardware and software solutions in the form of data prefetch. A linear or stride prefetcher recognizes linear sequences of memory accesses, e.g. loops always requesting the next 8 byte. Typical source code patterns, where this prefetching strategy works successfully, are loops iterating over vectors and arrays. This type of prefetching is even able to prefetch cache lines that were previously never used. Typically, performance may differ by up to 20% wall clock time depending on whether the prefetcher was able to prefetch as intended.

Presently, a prefetch instruction in the code allows for programs to announce future memory accesses. However, problems hereby may include determining the right location in the code to issue a prefetch instruction, the execution time consumption by the prefetch instructions itself, and the overall increase of code size. Also, placement rules may change from processor model to processor model, causing problems with old code already in use at customer sites.

High performance architectures and parallel computing systems may employ list-based prefetching. The prefetch engine keeps track of all current cache misses. Information regarding prior address misses are recorded in a list of addresses. The prefetch engine prefetches data according to the list, if there is a match between the current cache miss address and one of the addresses in the list. There are several refinements to this strategy in place to determine when this strategy should get used and to improve the effectiveness of the prefetching. Source code contains instructions to mark the sections for a type of prefetching to be performed.

Utilization of a library-based prefetch scheme can include prefetching by a helper thread running on a spare processor and included in the data-structure library code. Effective prefetching is possible with the library's knowledge of the data-structure type and frequent access patterns. This solution runs completely in software and requires no adoption of existing program code.

SUMMARY

Embodiments in accordance with the present invention disclose a method, computer program product and computer system for data prefetching utilizing a processor cache. A first address of a first instruction executed by a processor core is stored in a first table, wherein the first instruction writes a value into a register for utilization in addressing memory. The first address of the first instruction executed by the processor core is stored in a second table with multiple entries, wherein a register value loaded into the register is utilized as a second address by a second instruction executed by the processor core to access a main memory. A determination of whether an instruction address associated with an instruction executed by the processor core is present in the second table is performed, wherein the instruction address is the second address. Responsive to determining the instruction address is present in the second table, data is prefetched from the main memory, wherein the register value is utilized as the second address in the main memory.

BRIEF DESCRIPTION OF THE SEVERAL VIEWS OF THE DRAWINGS

The present invention together with the above-mentioned and other objects may best be understood from the following detailed description of the embodiments, but not restricted to the embodiments.

DETAILED DESCRIPTION

Figure 1:
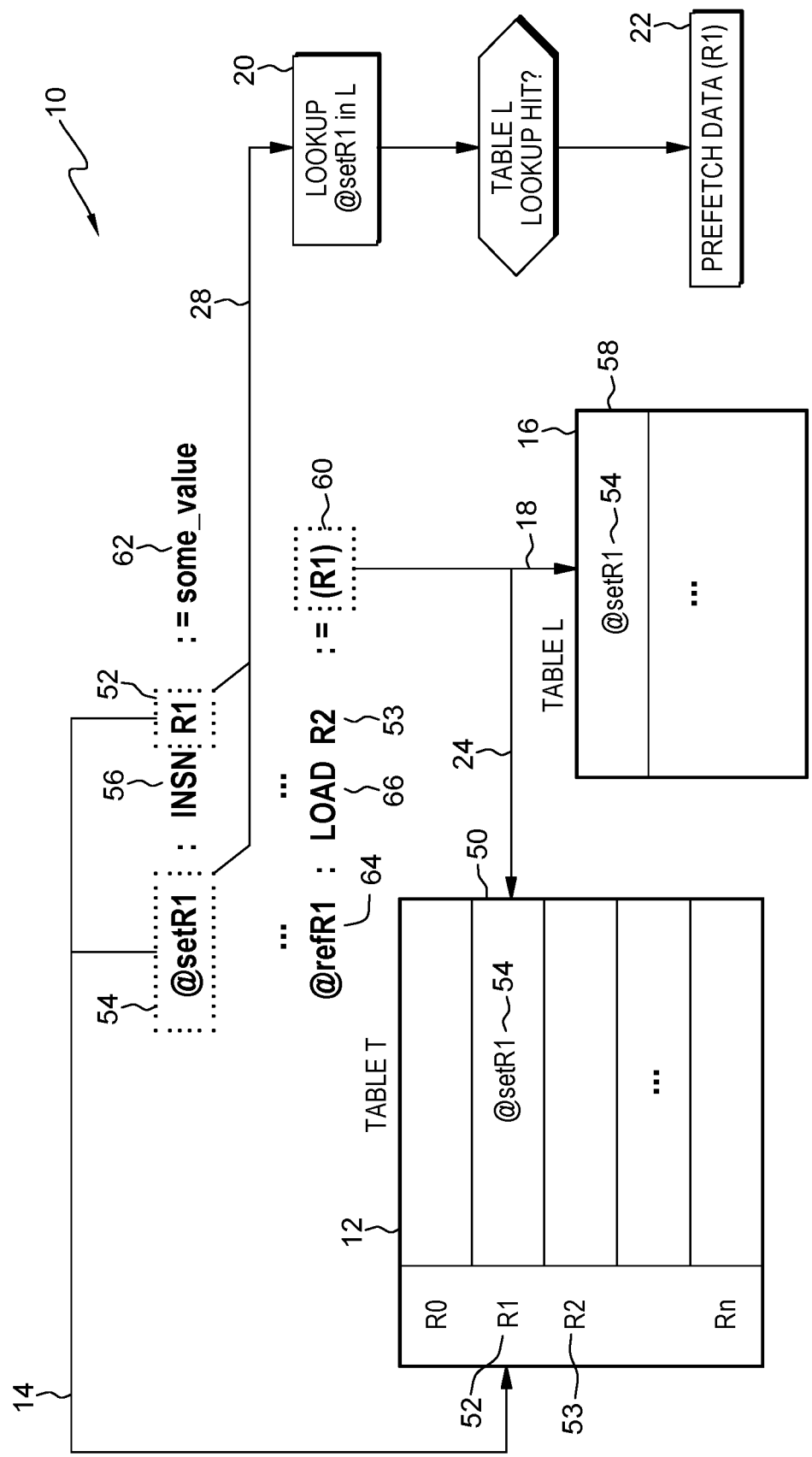
FIG. 1 depicts a data flow for prefetching data into a processor cache of a processor core connected to a main memory with a data prefetcher, in accordance with an embodiment of the present invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

A processor cache of a processor core connected to a main memory with a data prefetcher is proposed, comprising: (i) a first table with an individual entry for each register of the processor core, which register can at least be used for addressing; (ii) first storing means to store an address of a first instruction executed by the processor core into an entry in the first table when the instruction writes to the corresponding register; (iii) a second table with multiple entries; (iv) second storing means to store the address of the first instruction executed by the processor core into the second table when the first instruction wrote to the register and a value loaded into the register is used as an address by a second instruction executed by the processor core to access the main memory, wherein the address of the first instruction is obtained from the first table and stored into the second table; (v) identification means to identify if an instruction address, is found in the second table when an instruction is executed by the processor core; and (vi) prefetching means responsive to the identification means to prefetch data from the main memory, wherein the register value is used as starting address in the main memory.

As used herein, the first and second storing means of the embodiments of the invention may be implemented in hardware, like a microelectronic circuit, a microelectronic chip, a partition of a microelectronic chip, an electronic device or in software.

Likewise, identification means as well as prefetching means of the embodiments of the invention may be implemented in hardware, like a microelectronic circuit, a microelectronic chip, a partition of a microelectronic chip, an electronic device or in software.

The first access to any data structure causes cache misses. Successively, data structures already loaded into the cache may get replaced by other data. The next access to such data structure will cause cache misses. Cache misses take many cycles in addition to normal instruction execution. Frequent cache misses may increase program execution time significantly.

A successful strategy for performance optimization is cache prefetching. Additional hardware or software components may try to recognize data access patterns and then prefetch data which is likely to be accessed in near future. Data transfer is initiated early and runs parallel to other activities.

Generally, prefetches might be treated with low priority and may be carried out only if the memory system has enough bandwidth available. These features may also apply to the embodiments of the invention.

Linear prefetching handles regular memory access patterns only. According to embodiments of the invention existing prefetching mechanisms may be extended to support general, dynamic structures like linked lists, different kind of trees, general graph data structures. These structures cause access patterns that a linear prefetcher would recognize as irregular and could not handle.

According to embodiments of the invention existing software may be accelerated and there may be no need to modify or re-compile software and there may be no dependence on a particular operating system.

Further a data processing system is proposed, comprising at least a processor core and a processor cache connected to a main memory with a data prefetcher, comprising: (i) a first table with an individual entry for each register of the processor core, which register can at least be used for addressing; (ii) first storing means to store an address of a first instruction executed by the processor core into an entry in the first table when the instruction writes to the corresponding register; (iii) a second table with multiple entries; (iv) second storing means to store the address of the first instruction executed by the processor core into the second table when the first instruction wrote to the register and a value loaded into the register is used as an address by a second instruction executed by the processor core to access the main memory, wherein the address of the first instruction is obtained from the first table and stored into the second table; (v) identification means to identify if an instruction address is found in the second table when an instruction is executed by the processor core; and (vi) prefetching means responsive to the identification means to prefetch data from the main memory, wherein the register value is used as starting address in the main memory.

In a further aspect, a method is proposed for prefetching data into a processor cache of a processor core connected to a main memory with a data prefetcher, the method comprising: (i) storing an address of a first instruction executed by the processor core by first storing means into an entry in a first table when the instruction writes to a register, that can at least be used for addressing, where the first table comprises an individual entry for each register of the processor core; (ii) storing the address of the first instruction executed by the processor core by second storing means into a second table with multiple entries when the first instruction wrote to the register and a value loaded into the register is used as an address by a second instruction executed by the processor core to access the main memory, wherein the address of the first instruction is obtained from the first table and stored into the second table; (iii) identifying by identification means if an instruction address is found in the second table when an instruction is executed by the processor core; and (iv) prefetching data by prefetching means responsive to the identification means from the main memory, wherein the register value is used as starting address in the main memory.

Further, a favorable computer program product is proposed for prefetching data into a processor cache of a processor core connected to a main memory with a data prefetcher, the computer program product comprising a computer readable storage medium having program instructions embodied therewith, the program instructions executable by the computer system to cause the computer system to perform a method comprising: (i) storing an address of a first instruction executed by the processor core by first storing means into an entry in a first table when the instruction writes to a register, that can at least be used for addressing, where the first table comprises an individual entry for each register of the processor core; (ii) storing the address of the first instruction executed by the processor core by second storing means into a second table with multiple entries when the first instruction wrote to the register and a value loaded into the register is used as an address by a second instruction executed by the processor core to access the main memory, wherein the address of the first instruction is obtained from the first table and stored into the second table; (iii) identifying by identification means if an instruction address is found in the second table when an instruction is executed by the processor core; and (iv) prefetching data by prefetching means responsive to the identification means from the main memory, wherein the register value is used as starting address in the main memory.

The illustrative embodiments described herein provide a processor cache of a processor core connected to a main memory with a data prefetcher, a data processing system comprising at least a processor core and a processor cache connected to a main memory with a data prefetcher, a method for prefetching data into a processor cache of a processor core connected to a main memory with a data prefetcher, and a computer program product. The illustrative embodiments may be used for activating at least one of the memory core circuits. The illustrative embodiments are sometimes described herein using particular technologies only as an example for the clarity of the description.

For example, the following code pattern is often used for data accessing through linked lists of other data structures using pointers to refer to its components: LOAD R2:=(R1).

The register R2 is loaded with the content of the main memory location, whose address is given by register R1. In case this memory location has not been used recently, the access will cause a cache miss. According to an embodiment of the invention hardware is enabled to perform a prefetch for the respective cache line such that the memory location is already present when it gets used, thus saving the time to resolve the cache miss. Additionally, the cache miss may be recorded with an instruction set which includes a register that was used for addressing. Whenever such an instruction is executed again, prefetching of the address loaded into the register is triggered.

Register renaming does not play a role in the embodiments of the invention. References to registers in the embodiments of the invention including a first table refer to architected registers as used in the assembler code being executed.

Embodiments of the invention do not depend on whether the assembler code was generated by a compiler that might have executed a compiler optimization technique referred to as, register renaming.

Also, embodiments of the invention are independent from how the architected registers are implemented internally in a particular processor. Whether or not moving values between registers is internally implemented using register renaming, does not interfere with embodiments of the invention.

FIG. 1 depicts a data flow for prefetching data into a processor cache of a processor core connected to a main memory with a data prefetcher 10, in accordance with an embodiment of the present invention.

Figure 2:
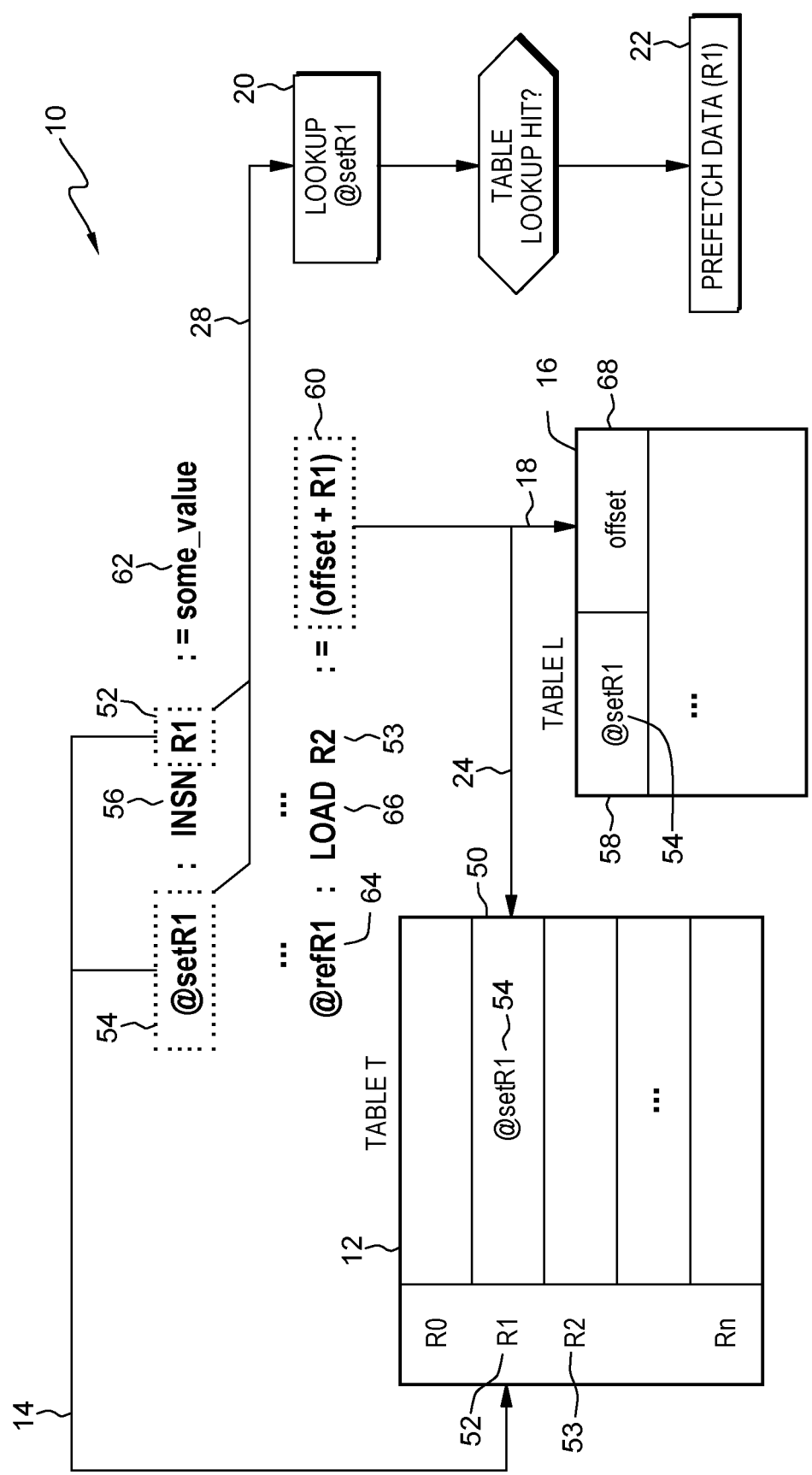
FIG. 2 depicts a data flow for prefetching data, in accordance with an embodiment of the present invention.
Figure 5:
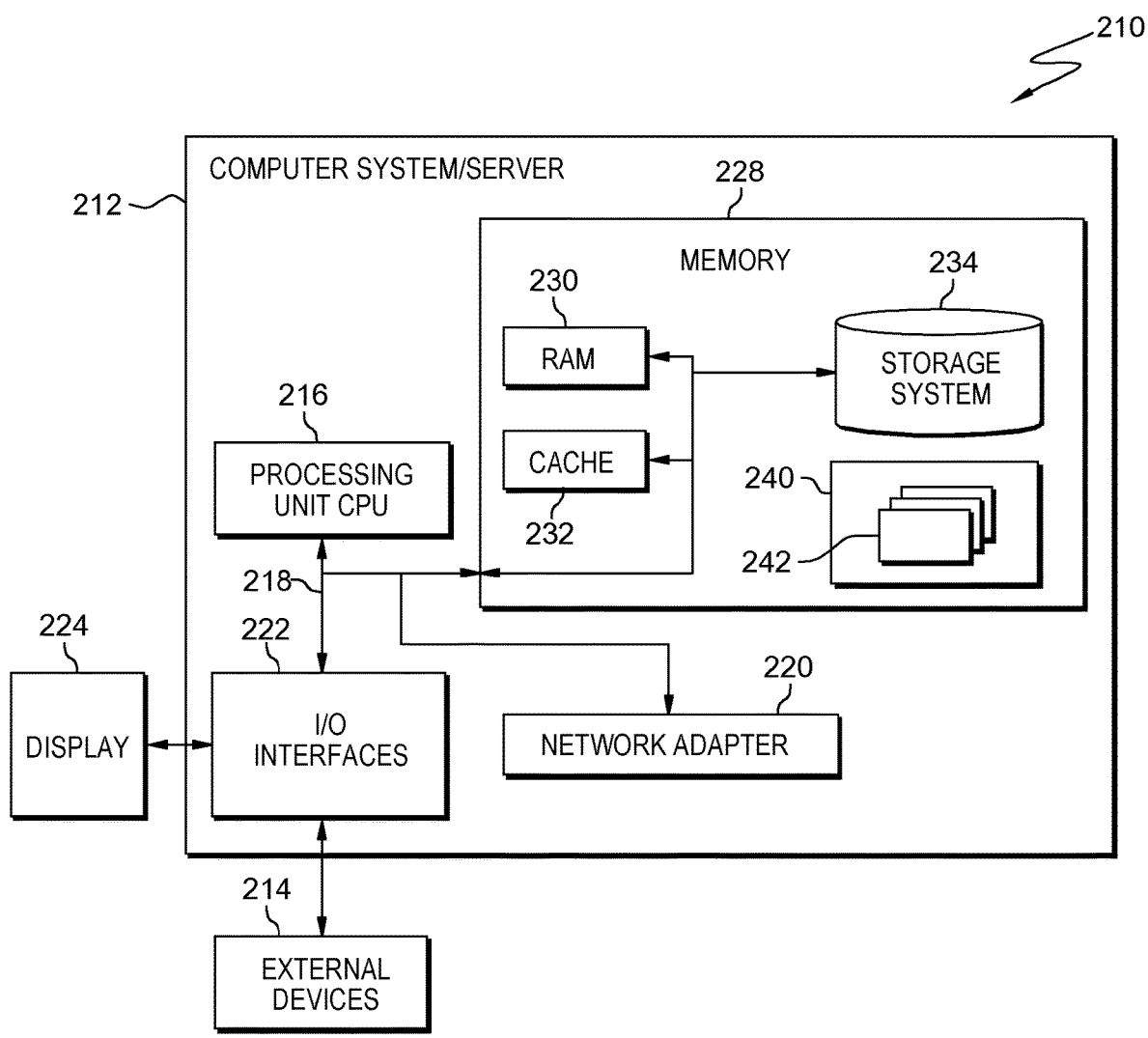
FIG. 5 depicts an example embodiment of a data processing system for executing a method, in accordance with an embodiment of the present invention.

According to an embodiment of the invention, data processing system 210, as shown, e.g., in FIG. 5, comprises at least processor core 216 and processor cache 232 connected to main memory 230 with data prefetcher 10, as e.g. depicted in FIG. 1 or 2.

Data prefetcher 10 comprises, (i) first table 12 with an individual entry 50 for each register 52 of processor core 216, where register 52 can at least be used for addressing. Data prefetcher 10 further comprises (ii) first storing means 14 to store address 54 of first instruction 56 executed by processor core 216 into entry 50 in first table 12 when instruction 56 writes to corresponding register 52; (iii) second table 16 with multiple entries 58; and (iv) second storing means 18 to store address 54 of first instruction 56 executed by processor core 216 into second table 16 when first instruction 56 wrote to register 52 and value 62 loaded into register 52 is used as address 60 by second instruction 66 executed by processor core 216 to access main memory 230. Address 54 of the first instruction 56 is obtained from first table 12 and stored into second table 16, e.g., in case it is not already contained in second table 16. Further data prefetcher 10 comprises (v) identification means 20 to identify if instruction address 54, 64 is found in second table 16 when instruction 56, 66 is executed by processor core 216; as well as (vi) prefetching means 22 responsive to identification means 20 to prefetch data from main memory 230, wherein register value 62 is used as starting address 60 in main memory 230.

In the first embodiment shown in FIG. 1 indirect addressing is used. Here, a typical code sequence may be: @setR1: INSN R1:=some_value and @refR1: LOAD R2:=(R1), where @setR1, @refR1 are addresses of the corresponding instructions 56, 66 and R1, R2 are names of registers. INSN may be instruction 56 that sets a register. Registers 52, 53 may be registers which at least can be used for addressing.

Alternatively, registers 52, 53 may also be represented as a general purpose register that can be used for storing data and/or addresses.

Thus register R2 is loaded with the value from the main memory address given by register R1 52. This code pattern is typically found in a code iterating over linked data structures.

The embodiment of the invention uses two tables 12, 16. A first table T 12 has one entry for every register 52. Entry 50 can hold address 54 or a hash value derived from address 54, identifying instruction 56. Whenever register 52 is set, address 54 of the setting instruction 52 is written into table entry 50.

In the code example of FIG. 1, upon executing the INSN instruction 56 at address @setR1 54, table 12 gets entry 50 stating that the most recent set operation for register R1 52 was at address @setR1 54.

A second table L 16 contains a list of instructions 56, 66 that load addresses 60, 62 into registers 52 later used for addressing data memory.

In the code example, upon executing LOAD instruction 66 at address @refR1 64, address 54 of the most recent setting instruction 56, @setR1, is taken from entry 50 of register R1 52 in the first table T 12 and put as entry 58 into the second table L 16.

Whenever a first INSN instruction 56 is executed, the hardware searches address 54 in table L 16. If address 54 is found, the value being loaded is considered an area of address 54, from which data will be loaded in future. This address 54 is thus sent to the data cache logic which fetches the cache line containing this address 54. This early prefetch ensures that the required memory location is already loaded into the cache when it is later requested by LOAD instruction 66 at address @refR1 64.

Summarizing, the INSN instruction 56 at address @setR1 54 performs an implicit prefetch after the code has been executed for the first time. Semantically, it behaves as if there was a prefetch instruction immediately following.

Thus subsequent executions of instruction 56 may comprise prefetching data for main memory 230 being addressed by instruction 56, if addresses 54 of instruction 56 are stored into first table 12 and the second table 16.

The request to prefetch might be treated with low priority, i.e. the main memory system may only perform it in case there are not other operations ongoing. Any errors occurring during data prefetch would be ignored.

According to embodiments of the invention software code may be accelerated without the need of an adaptation of the binary code, e.g. no recompile is required for the old binary code. The method may be applicable to different kind of software and operating systems.

There are several possible strategies for managing entries 58 in the second table L 16. A conventional cache implementation strategy could be used, e.g. an n-way associative cache. More elaborate schemes can include, e.g. a least-recently-used (LRU)—like strategy which counts how frequently a particular address is referred to, thus that a new entry 58 would replace the least important one.

A major difference to linear prefetching and other existing prefetching strategies is that prefetching is triggered by observing instruction 56 that loads a particular register 52 while other methods observe the instruction that actually performs the data access.

FIG. 2 depicts a data flow for prefetching data, in accordance with an embodiment of the present invention, using indirect addressing with an additional offset 68. This example is similar to the embodiment shown in FIG. 1, with the exception that this example includes constant value 68 when performing the indirect addressing.

In this embodiment, entries 58 of second table 16 may comprise offset 68 of value 62 loaded as an address into register 52 by first instruction 56 which configure table entry 58. Offset 68 may be used by prefetching means 22 when prefetching the data from memory 230 addressed by value 62. The offset 68 may be stored together with address 54 of instruction 56 into the corresponding entry 58 of the second table 16.

Here, a typical code sequence may be: @setR1: INSN R1:=some_value and @refR1: LOAD R2:=(offset+R1).

Offset 68, e.g., can be any 20 bit value. To handle this type of LOAD instruction 66, the table L 16 may be extended to store offset 68. In the code example, the table T 12 is maintained as before but when LOAD instruction 66 at address @refR1 64 is executed, the address @setR1 is put into entry 58 of the table L 16 together with offset 68.

Whenever a LOAD instruction 66 is executed, the hardware searches address 54 in the table L 16 as discussed above. However, if offset value 68 has been stored, address 54 being loaded may be added to offset 68 and the sum may be sent to the cache logic for prefetching. An implementation may store offset value 68 of "0" in case of an indirect load without offset value 68.

A further embodiment of the invention may exclude a register that is used as stack pointer from triggering prefetching for two reasons. Firstly, there are typically many offsets referring to the stack pointer because it is used to access all variables allocated on the stack. Secondly, accesses to variables allocated on the stack usually happen frequently. It is likely that these variables are already all in the cache, so prefetching may not be necessary.

A further embodiment of the invention, similar to an example above with indirect addressing with an offset, except that there might be more than one instruction using the register for indirect memory access, and using different offsets. This case could be covered using a more elaborate implementation of table L 16 which stores multiple entries 58 for a single address 54, yielding multiple hits for LOAD instructions 66 with different offsets 68 and triggering multiple prefetches.

According to a further embodiment of the invention, indirect addressing using an index register may be implemented. A LOAD instruction may additionally have an index register and the code pattern is typically found in loops iterating over vectors or arrays. In this embodiment, prefetching means 22 advantageously may use an index register for indirect addressing.

Due to experience with cache strategies and with inserting prefetching instructions prefetching may also have a negative effect on overall performance because may replace data that would be used a lot in future with data not used that much.

Therefore, an enhancement to the basic approach according to embodiments of the invention may thus be to determine the relative importance of a possible prefetch by counting a number of times it gets taken during program execution and then perform the prefetch only after it has occurred a specified number of times.

Figure 3:
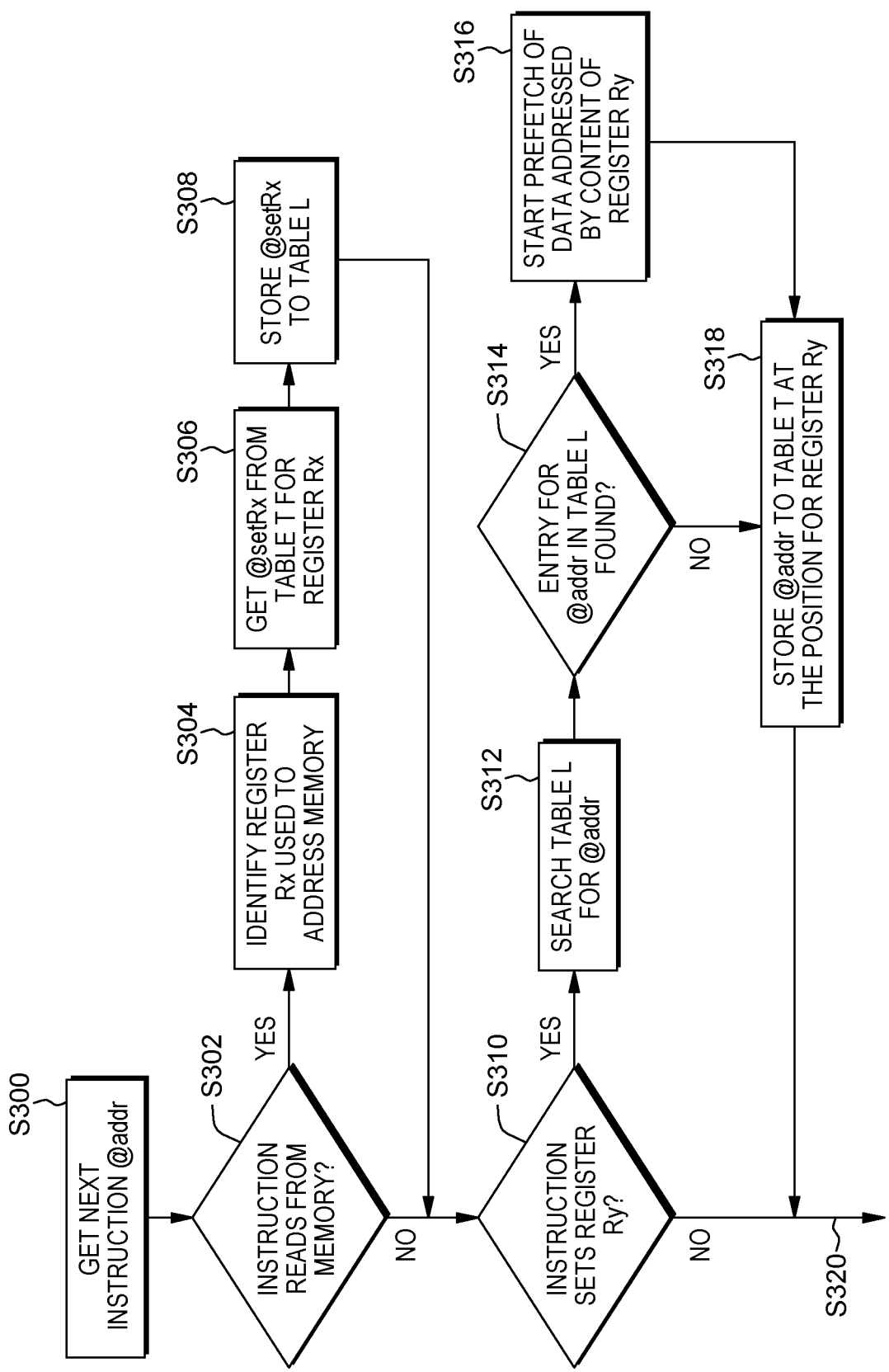
FIG. 3 depicts a flow chart for prefetching data into a processor cache of a processor core connected to a main memory with a data prefetcher, in accordance with an embodiment of the present invention.

FIG. 3 depicts a flow chart for prefetching data into a processor cache of a processor core connected to a main memory with a data prefetcher, in accordance with an embodiment of the present invention. The reference numerals of components used in the descriptions refer to the embodiments described in FIGS. 1, 2 and 5, respectively.

The inventive method for prefetching data into processor cache 232 of processor core 216 connected to main memory 230 with data prefetcher 10 comprises (i) storing address 54 of a first instruction 56 executed by processor core 216 by first storing means 14 into entry 50 in a first table T 12 (according to the embodiments shown in FIGS. 1 and 2) when instruction 56 writes to register 52, that can at least be used for addressing. The first table T 12 comprises an individual entry 50 for each register 52 of processor core 216. Further the method comprises (ii) storing address 54 of the first instruction 56 executed by processor core 216 by second storing means 18 into a second table L 16 (according to the embodiments shown in FIGS. 1 and 2) with multiple entries 58 when the first instruction 56 wrote to register 52 and value 62 loaded into register 52 is used as address 60 by a second instruction 66 executed by processor core 216 to access main memory 230, wherein address 54 of the first instruction 56 is obtained from the first table T 12 and stored into the second table L 16; (iii) identifying by identification means 20 if instruction address 54, 64 is found in the second table L 16 when instruction 56, 66 is executed by processor core 216; and (iv) prefetching data by prefetching means 22 responsive to the identification means 20 from main memory 230, wherein register value 62 is used as starting address 60 in main memory 230.

A procedure according to this method is explained in the embodiment shown in FIG. 3. In step S300, a next instruction at address @addr is received. In step S302, it is checked if the instruction performs a read access to main memory 230. If this is the case, in step S304 the register Rx is identified that is used to address main memory 230. Next in step S306 the address @setRx for the register Rx is obtained from the first table T 12, followed by storing the address @setRx to the second table L 16 in step S308. Then the process flow continues in step S310 by checking if the instruction sets a register Ry. Here the process flow also proceeds if in step S302 it is observed that the instruction does not perform a read access to main memory 230. If the instruction sets the register Ry, a search is started in the second table L 16 for the address @addr of the instruction in step S312, followed by a check for an entry for the address @addr in the second table L 16 in step S314. If @addr is found in the second table L 16 a prefetch of data addressed by the content of the register Ry is started in step S316 and finally in step S318 the address @addr is stored into the first table T 12 at the position for the register Ry. If in step S314 the address @addr is not found in the second table L 16, the process flow directly continues in step S318 by storing the address @addr in the first table T 12. Having completed step S318, as well as, if the instruction does not set Ry, the process flow continues, S320.

Figure 4:
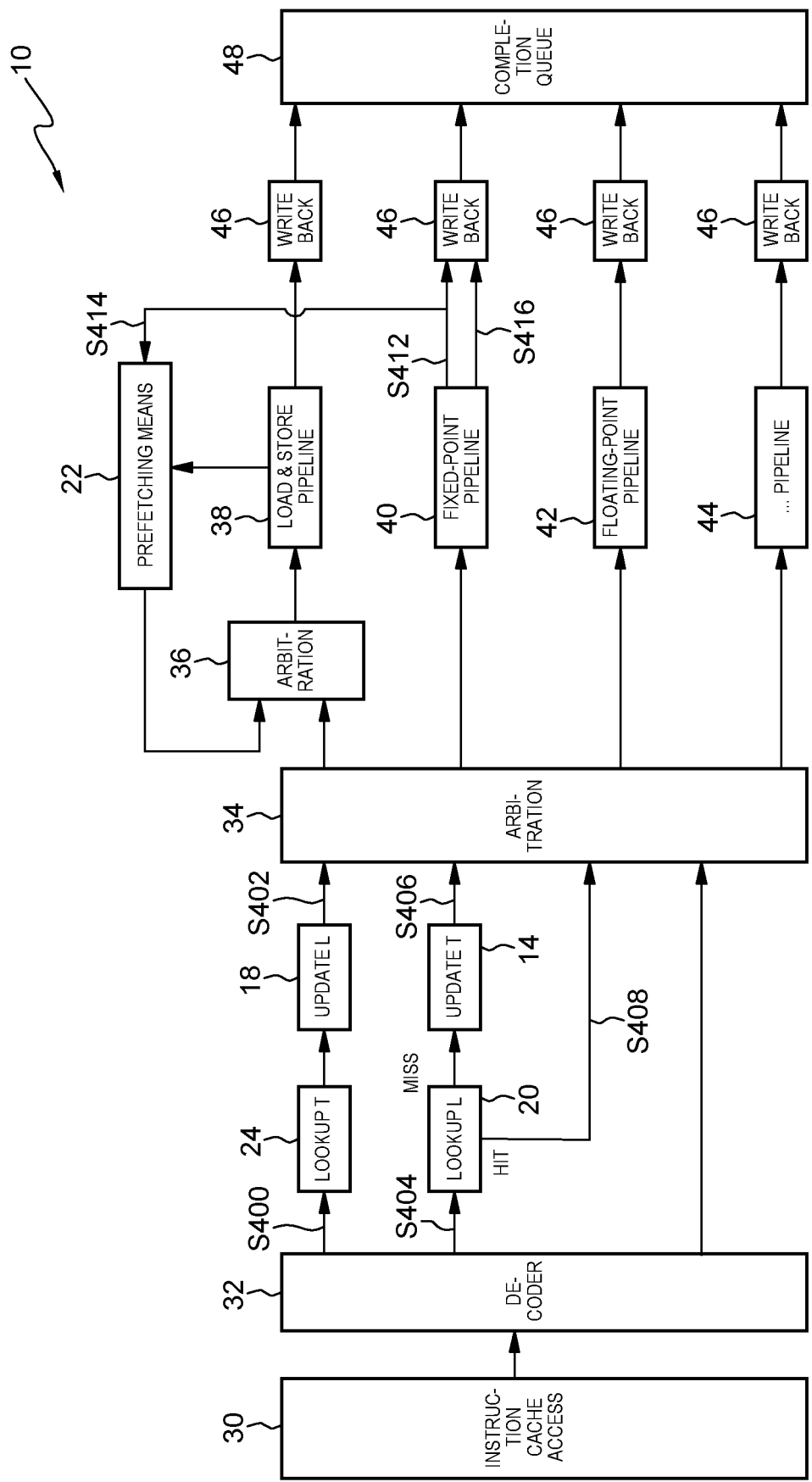
FIG. 4 depicts a block diagram for prefetching data into a processor cache of a processor core connected to a main memory with a data prefetcher, in accordance with an embodiment of the present invention.

FIG. 4 depicts a block diagram for prefetching data into a processor cache of a processor core connected to a main memory with a data prefetcher, in accordance with an embodiment of the present invention. The block diagram exhibits components and a process flow of a typical data processing system supplemented by components and a process flow which are specific to the embodiment of the invention.

The process flow starts with the instruction cache access 30, where a subsequent instruction is loaded. The loaded instruction is decoded in decoder 32 concerning address and register to be read and/or written. If the instruction reads from the main memory, S400, then lookup process 24 in the entries of the first table T for the register initializes, followed by an update process 18 for the entries of the second table L, resulting in a LOAD operation S402.

The data prefetch operation initializes with loading the targeting register S404, followed by lookup process 20 in the second table L for the address of the first instruction. If the address is located in the second table L, the load and prefetch operation S408 initializes. If the address is not located in the second table L, the first table T is updated via process 14, and the LOAD operation S406 continues.

Arbitration component 34 determines how and where to execute the instruction in the processor core delivering information to corresponding pipelines 40, 42, 44. According to embodiments of the invention a fixed-point pipeline 40 is fed. If prefetching is concerned a LOAD and prefetch operation is started, S412, triggering prefetching means 22 with information from a load & store pipeline 38 of address values written to the register, S414. Information from prefetching means 22 as well as from the arbitration component 34 is fed to a second arbitration component 36, feeding the load & store pipeline 38. Operations S416 being not relevant for prefetching are continued directly with a write back process 46 to a completion queue 48. The load & store pipeline also may proceed with a write back operation 48 to completion queue 48. Operations from other pipelines 42, 44 lead directly to a write back process 46 to completion queue 48.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
responsive to executing a first instruction to cause a value to be written to a first register, storing, by one or more processors, a first address of the first instruction executed by a processor core into a first entry in a first table for utilization in addressing memory, wherein the first table includes an entry out of a first plurality of entries for each register from a plurality of registers of the processor core;
responsive to executing a load of a second register with another value from a main memory address given by the first register, storing, by one or more processors, the first address of the first instruction executed by the processor core in a second table with a second plurality of entries, wherein the first address of the first instruction is obtained from the first table and stored in the second table, and wherein the first address of the first instruction is for a latest setting instruction;

determining, by one or more processors, whether an instruction address associated with an instruction executed by the processor core is present in the second table, wherein the main memory address is the first address from which data will be loaded in a future instruction;

responsive to determining the instruction address is present in the second table, determining, by one or more processors, a plurality of times a data value for prefetching is taken during program execution; and responsive to determining the plurality of times the data value was taken for program execution has occurred a specified number of times, prefetching, by one or more processors, the data value stored at the main memory address by a second instruction at the first address into a cache for subsequent load executions.

2. The method of claim 1, wherein prefetching the data value at the main memory by the second instruction at the first address into the cache for subsequent load executions includes utilization of an offset of the first address included in the second plurality of entries of the second table.

3. The method of claim 2, further comprising:
storing, by one or more processors, the offset with the first address of the first instruction executed by the processor core in the second table with the second plurality of entries.

4. The method of claim 2, wherein the offset is a 20 bit value.

5. The method of claim 1, wherein prefetching the first address into the cache for subsequent load executions includes utilizing an index register for indirect addressing.

6. A computer program product comprising:
one or more computer readable storage media and program instructions stored on at least one of the one or more storage media, the program instructions comprising:

program instructions to, responsive to executing a first instruction to cause a value to be written to a first register, store a first address of the first instruction executed by a processor core into a first entry in a first table for utilization in addressing memory, wherein the first table includes an entry out of a first plurality of entries for each register from a plurality of registers of the processor core;

program instructions to, responsive to executing a load of a second register with another value from a main memory address given by the first register, store the first address of the first instruction executed by the processor core in a second table with a second plurality of entries, wherein the first address of the first instruction is obtained from the first table and stored in the second table, and wherein the first address of the first instruction is for a latest setting instruction;

program instructions to determine whether an instruction address associated with an instruction executed by the processor core is present in the second table, wherein the main memory address is the first address from which data will be loaded in a future instruction;

program instructions to, responsive to determining the instruction address is present in the second table, determine a plurality of times a data value for prefetching is taken during program execution; and program instructions to, responsive to determining the plurality of times the data value was taken for program execution has occurred a specified number of times, prefetch the data value stored at the main memory address by a second instruction at the first address into a cache for subsequent load executions.

7. The computer program product of claim 6, wherein program instructions to prefetch the data value at the main memory by the second instruction at the first address into the cache for subsequent load executions includes utilization of an offset of the first address included in the second plurality of entries of the second table.

8. The computer program product of claim 7, further comprising program instructions, stored on the one or more computer readable storage media, which when executed by a processor, cause the processor to:
store the offset with the first address of the first instruction executed by the processor core in the second table with the second plurality of entries.

9. The computer program product of claim 7, wherein the offset is a 20 bit value.

10. The computer program product of claim 6, wherein program instructions to prefetch the first address into the cache for subsequent load executions includes utilizing an index register for indirect addressing.

11. A computer system comprising:
a processor core;
a processor cache coupled to a main memory and the processor core; and
a data prefetcher coupled to the processor core and the main memory;

responsive to executing a first instruction to cause a value to be written to a first register, the processor core operated to store a first address of the first instruction executed by a processor core into a first entry in a first table for utilization in addressing memory, wherein the first table includes an entry out of a first plurality of entries for each register from a plurality of registers of the processor core;

responsive to executing a load of a second register with another value from a main memory address given by the first register, the processor further operated to store the first address of the first instruction executed by the processor core in a second table with a second plurality of entries, wherein the first address of the first instruction is obtained from the first table and stored in the second table, and wherein the first address of the first instruction is for a latest setting instruction;

the processor core further operated to determine whether an instruction address associated with an instruction executed by the processor core is present in the second table, wherein the main memory address is the first address from which data will be loaded in a future instruction;

in response to the processor core determining the instruction address is present in the second table, the processor further operated to determine a plurality of times a data value for prefetching is taken during program execution; and the data prefetcher, in response to the processor determining the plurality of times the data value was taken for program execution has occurred a specified number of times, operated to prefetch the data value stored at the main memory address by a second instruction at the first address into a cache for subsequent load executions.

12. The computer system of claim 11, wherein the data prefetcher operated to prefetch the data value at the main memory by the second instruction at the first address into the cache for subsequent load executions-includes utilization of an offset of the first address included in the second plurality of entries of the second table.

13. The computer system of claim 12, further comprising:
the processor core further operated to store the offset with the first address of the first instruction executed by the processor core in the second table with the second plurality of entries.

14. The computer system of claim 12, wherein the offset is a 20 bit value.

15. The computer system of claim 11, wherein the data prefetcher operated to prefetch the first address into the cache for subsequent load executions includes utilizing an index register for indirect addressing.

* * * * *